UNITED STATES PATENT OFFICE.

FRITZ ACKERMANN, OF BERLIN-FRIEDENAU, GERMANY, ASSIGNOR TO ACTIEN GESELLSCHAFT FÜR ANILIN FABRIKATION, OF BERLIN, GERMANY.

DISAZO DYE.

1,173,077.  Specification of Letters Patent.  Patented Feb. 22, 1916.

No Drawing.   Application filed March 22, 1915.   Serial No. 16,227.

*To all whom it may concern:*

Be it known that I, FRITZ ACKERMANN, a citizen of Germany, residing at Berlin-Friedenau, Germany, my post-office address being Bismarckstrasse 3, Berlin-Friedenau, Germany, have invented certain new and useful Improvements in Disazo Dye, of which the following is a specification.

The present invention relates to a disazo dye most probably corresponding to the formula:

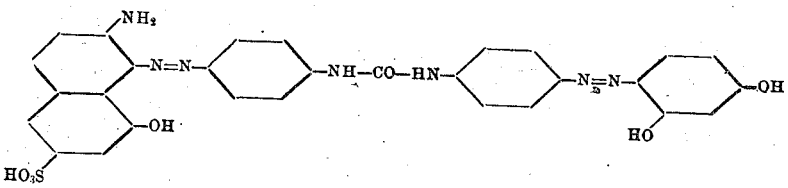

It may be manufactured by combining 1 molecule of tetrazotized 4.4′-diaminodiphenylurea with 1 molecule of 2-amino-8-naphthol-6-sulfonic acid in an acid medium and 1 molecule of resorcinol.

The sodium salt forms a black-brown powder soluble in water with a red-brown color. On addition of sodium hydroxid the solution becomes more reddish. When acidified with hydrochloric acid the solution separates the dye in flocks. The dye is dissolved by concentrated sulfuric acid to a brownish-red solution from which the dye is precipitated again by adding ice. Strong reducing agents discolorize the dye yielding 4.4′-diaminodiphenylurea, 1.2-diamino-8-naphthol-6-sulfonic acid and aminoresorcinol. The dye produces on cotton in a neutral or alkaline bath reddish brown shades which become fast to washing when treated with an aldehyde, such as formaldehyde.

Example: 12.1 parts of 4.4′-diaminodiphenylurea are tetrazotized in the known manner by means of 50 parts of hydrochloric acid 12° Bé. and 6.9 parts of sodium nitrite. While stirring a neutral solution made from 12 parts of 2-amino-8-naphthol-6-sulfonic acid and sodium carbonate slowly flows hereto. After the mass is stirred for a good time 21 parts of crystallized sodium acetate are added. The intermediate product runs into a solution made of 5.8 parts of resorcinol, 6 parts of caustic soda lye 40° Bé. and 18.5 parts of calcined sodium carbonate. The dye is worked up as usual.

I claim—

The herein-described disazo dye having most probably the formula:

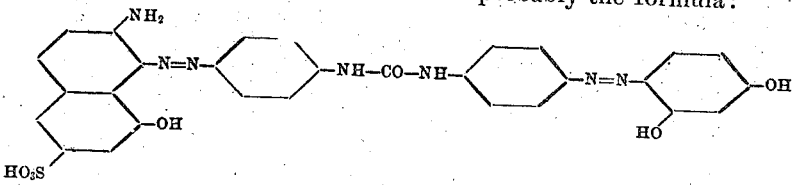

which is in the state of dried and pulverized sodium salt a black-brown powder soluble in water with a red-brown color, turning to more reddish on addition of sodium hydroxid, and separating the dye in flocks when acidified; being dissolved by concentrated sulfuric acid to a brownish red solution, the dye being precipitated again by adding ice; yielding upon reduction 4.4′-diaminodiphenylurea, 1.2-diamino-8-naphthol-6-sulfonic acid and aminoresorcinol; dyeing cotton reddish brown shades, which become fast to washing when treated with an aldehyde, such as formaldehyde.

In testimony whereof I have hereunto set my hand in presence of two subscribing witnesses.

FRITZ ACKERMANN.

Witnesses:
  HENRY HASPER,
  WOLDEMAR HAUPT.